US011969859B2

(12) United States Patent
Haimer

(10) Patent No.: US 11,969,859 B2
(45) Date of Patent: Apr. 30, 2024

(54) MACHINE TOOL SYSTEM USING AUTOMATIC BALANCING PROTOCOL

(71) Applicant: FRANZ HAIMER MASCHINENBAU KG, Hollenbach (DE)

(72) Inventor: Andreas Haimer, Igenhausen (DE)

(73) Assignee: FRANZ HAIMER MASCHINENBAU KG, Igenhausen (DE)

( * ) Notice: Subject to any disclaimer, the term of this patent is extended or adjusted under 35 U.S.C. 154(b) by 1103 days.

(21) Appl. No.: 16/634,229

(22) PCT Filed: Jul. 26, 2018

(86) PCT No.: PCT/EP2018/070360
§ 371 (c)(1),
(2) Date: Jan. 27, 2020

(87) PCT Pub. No.: WO2019/020775
PCT Pub. Date: Jan. 31, 2019

(65) Prior Publication Data
US 2021/0086325 A1     Mar. 25, 2021

(30) Foreign Application Priority Data

Jul. 26, 2017   (DE) ................ 10 2017 116 878.8
Jul. 27, 2017   (DE) ................ 10 2017 117 059.6

(51) Int. Cl.
*B24B 41/04*       (2006.01)
*B23Q 17/00*       (2006.01)
(Continued)

(52) U.S. Cl.
CPC ........... *B24B 41/042* (2013.01); *B23Q 17/00* (2013.01); *B23Q 11/0035* (2013.01); *B23Q 2017/001* (2013.01)

(58) Field of Classification Search
CPC ... B24B 41/042; B23Q 17/00; B23Q 11/0035; B23Q 2017/001; G05B 2219/49304; G05B 2219/49305; G05B 19/40938; Y02P 90/02
(Continued)

(56) References Cited

U.S. PATENT DOCUMENTS

2003/0040832 A1* 2/2003 Rutkowski ....... G05B 19/40937
                                                                 700/159
2017/0095070 A1* 4/2017 Machiorlette ........ A46B 15/001

FOREIGN PATENT DOCUMENTS

EP        1950005 A1    7/2008

OTHER PUBLICATIONS

International Search Report and Written Opinion of the International Search Authority issued in PCT/EP2018/070360, dated Nov. 26, 2018; ISA/EP.

* cited by examiner

*Primary Examiner* — Michael J Brown
(74) *Attorney, Agent, or Firm* — Harness, Dickey & Pierce, P.L.C.

(57) ABSTRACT

The invention relates to a machine tool system (1) comprising a machine tool (2) comprising a spindle (3) that can be rotatably driven for machining workpieces, with a plurality of tools each clamped in chucks (5), in the form of so-called tool heads (4), that can be coupled to the spindle (3), and a balancing device (8) for balancing the tool heads (4), the machine tool system (1) comprising a data memory (11) in which the balancing protocol associated with each system-associated tool head (4) is stored, and a controller (12) that reads balancing data from the balancing protocol, for a tool head (4) coupled to the spindle (3), and compares it with at least one parameter of the machining for which said tool head (4) is provided, or with at least one general balancing (Continued)

Figure 1:
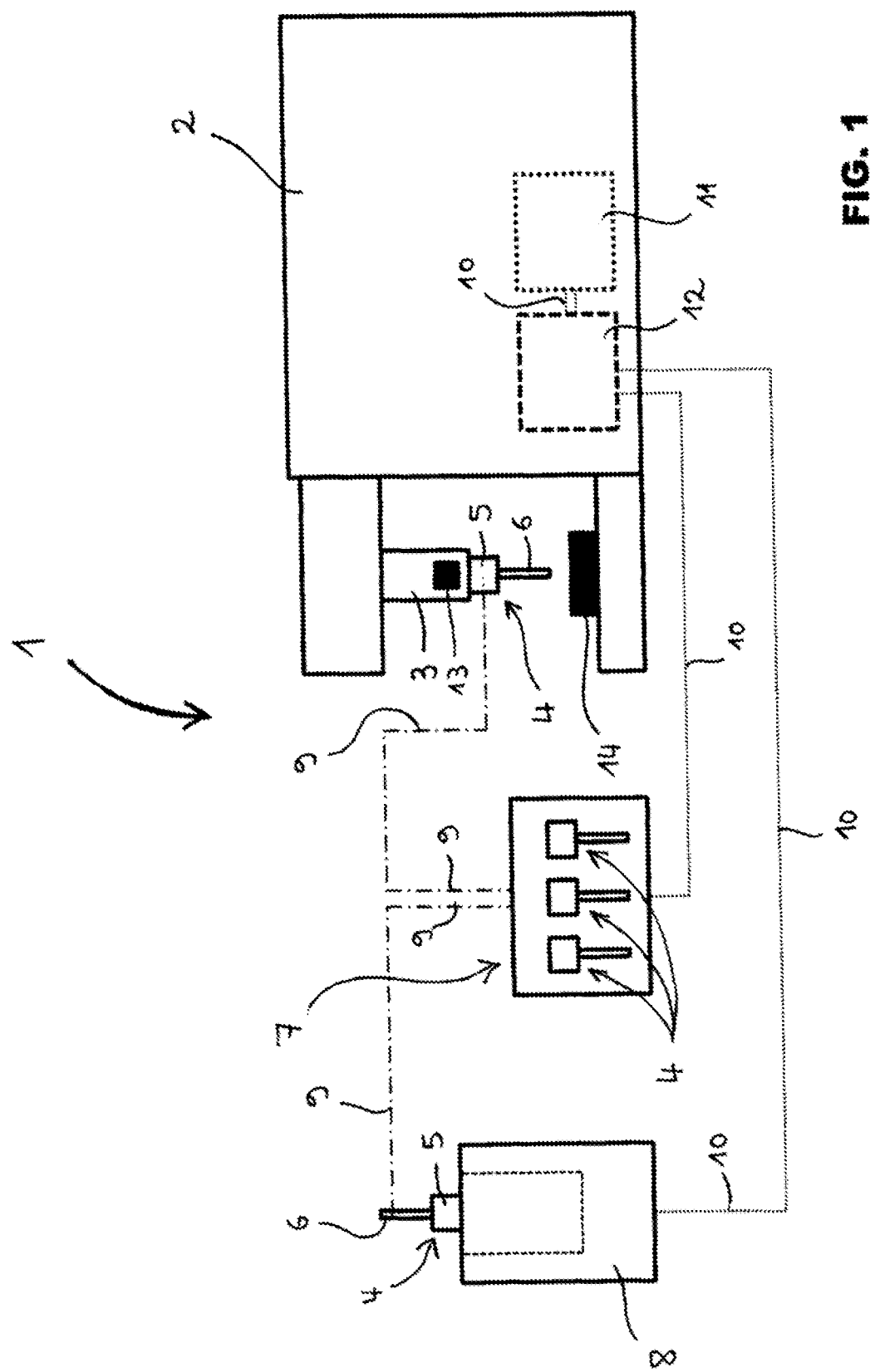

parameter, the machine tool system (1) preferably being designed such that it rejects a tool head (4) when there is no available balancing data for said tool head (4).

23 Claims, 2 Drawing Sheets

(51) Int. Cl.
  *B23Q 11/00* (2006.01)
  *G05B 19/40* (2006.01)
(58) Field of Classification Search
  USPC .......................................................... 700/180
  See application file for complete search history.

- Information available about the state of balance?
- Tool balanced?
- Date/time of last balancing within a permissible time period
- Permissible rotational speed ≥ operating rotational speed
- Balancing quality high enough?
- Actual residual unbalance ≤ permissible residual unbalance

FIG. 2 ns which are actually occurring and stop the processing if the vibrations exceed a maximum permissible limiting value.

However, such a stop can, of course, not occur until the processing has already started, whereas stopping the processing means downtimes and idle times at the machine since the cause of the vibrations firstly has to be found and eliminated. This results in high costs and delays.

In machines without vibration monitoring, the vibrations can cause damage to workpieces and machine without warning.

The Problem Addressed by the Invention

In view of the above, the invention addresses the problem of providing a system in which the unbalance properties of a machine tool can be taken into account reliably, early and as far as possible already at a time before the next start of operation of the tool head.

Solution According to the Invention

The problem is solved with the features of the first main claim.

Accordingly, a machine tool system having a machine tool which comprises (at least) one main spindle or spindle which can be driven in rotation for the purpose of metal-cutting machining of workpieces is proposed.

The machine tool system includes a plurality of tools, the so-called tool heads, which are each clamped in chucks. The tool heads form an interface—usually standardized—with the tool spindle. They can be coupled to the spindle, usually by means of automatic tool changers.

The machine tool system according to the invention also includes a balancing device or balancing machine for balancing the tool heads. The balancing device can be integrated in many cases directly into the machine, but will usually be a separate balancing machine which is linked to or corresponds to the machine tool. The balancing device is configured physically in such a way that it is able to output or store at least one balancing data item determined in the course of the balancing, or the balancing data items which are determined in the course of balancing, for further processing.

It goes without saying that the balancing device is not necessarily located in the spatial vicinity of the machine tool and/or does not have to be connected thereto for data transmission. The balancing process or the determination of the balancing data can also be carried out externally by means of a service provider or supplier.

The machine tool system also comprises a data memory which is installed in a functionally ready state for the purpose according to the invention. Alternatively, the machine tool system for the purpose according to the invention could comprise a link to a data memory. The balancing data are respectively stored as a balancing log in said data memory for the tool heads which are associated with the system, i.e. the tool heads which are currently intended for use on the machine tool which is associated with the system.

The machine tool system preferably also has a further (usually additional) memory in which balancing data of tool heads which have been used in the past is stored, e.g. in the form of a log file. This makes it possible, for example, to draw conclusions about the cause of damage retrospectively

MACHINE TOOL SYSTEM USING AUTOMATIC BALANCING PROTOCOL

CROSS-REFERENCE TO RELATED APPLICATIONS

This application is a 371 U.S. National Phase of International Application No. PCT/EP2018/070360, filed on Jul. 26, 2018, which claims priority to German Application No. 10 2017 116 878.8, filed on Jul. 26, 2017 and German Application No. 10 2017 117 059.6, filed on Jul. 27, 2017. The entire disclosures of the above applications are incorporated herein by reference.

The invention relates to a machine tool system according to the preamble of claim 1 and to an associated machine tool according to claim 9, to a complementary method according to claim 12 and to a corresponding use according to claim 13.

TECHNICAL BACKGROUND

Machine tools for metal-cutting processing are usually equipped nowadays with tools which are referred to below as "machine tools" and which are composed of a tool chuck or chuck with the metal-cutting tool, e.g. in the form of an end scouring-milling device, secured therein. In addition, such a tool head can comprise further components, e.g. a spray system for spraying a jet of coolant onto the tool cutters.

In order to change the tools rapidly and precisely, the current tool head is easily decoupled from the spindle of the machine tool. Then, another tool head in the form of a chuck is coupled by securing the metal-cutting tool required for the next processing step, for example in the form of an end finishing-type milling device.

The assembly of a metal-cutting tool with a tool holder and, if appropriate, the further components, for example a coolant pipe, a tightening bolt or a modular extension, inevitably gives rise to a tool head which has a certain amount of unbalance. As soon as the tool head rotates when it has been coupled to the spindle its not insignificant unbalance causes vibrations which adversely affects the quality of the metal-cutting process and can even destroy the spindle in the range which is close to resonance.

Therefore, tool heads of the type in question here are in the best case balanced after their assembly or before they are first put into service.

However, the balancing process is costly and can be unintentionally or intentionally omitted even though a warning message in the form of a sticker is usually applied to the machine spindle.

Even with tool heads which have been balanced there is the risk of the last balancing process being already a relatively long time in the past and of the current balance state not being known. In this context it is important to remember that the state of balance can change during operation, e.g. as a result of material erosion due to wear, or due to notches on the cutters of the metal-cutting tool and/or as a result of the fact that the metal-cutting tool migrates in the tool holder owing to vibrations and as a result of brief overloading, even if amounts of migration are often only small. Owing to this, in the course of operation or after repeated use of the tool heads for work, unexpected unbalances can occur.

Modern machine tools therefore have vibration monitoring by means of sensors in the region of the spindle, usually in the form of acceleration sensors. They measure the vibrawhen there is a defect in the spindle. The machine tool system can also particularly preferably have a connection to a networked data memory.

In its wider sense, the term "balancing data" in this description and the following claims also respectively means just a single "balancing data item". The term "balancing data" therefore respectively also stands for the singular. However, the term "balancing data" is preferably understood in its narrower sense and then stands for at least two different data items of a tool head.

Finally, the machine tool system comprises a controller installed in a functionally ready state for the purpose according to the invention. Said controller reads out the associated balancing log for a tool head which is to be coupled to the spindle. The controller then compares what it has read out with the parameter or parameters of the upcoming metal-cutting processing for which this tool head is provided.

In this way, it is possible test automatically, in each case at a time before the selected tool head starts it next use cycle, whether the tool head can be used as planned and whether, if appropriate, measures are to be taken. Alternatively, during the processing the status can be displayed with a "balancing traffic light" or a warning signal can be transmitted.

This generally means that the controller tests to what extent the respective tool head is suitable for the provided metal-cutting processing, in view of the balancing data stored in the balancing log thereof. If it is found to be unsuitable, the tool head is rejected, for example, as unsuitable—for example because its documented state of balance does not match the intended operating rotational speed, or a warning is displayed.

In contrast to similar methods, the explained objective of the invention is not only to document the isolated information about the state of a tool. Instead, the intention is to provide a possible way of prolonging the service life of a tool, also in particular of the spindle, by logging and comparing. If an eye is kept on the forces which act on the spindle which is connected during processing to a tool head which is not balanced or is not sufficiently balanced, the reason why the monitoring of the state of balance prolongs the useful life of the spindle and reduces the risk of failure becomes clear quickly. Firstly, this permits not only monitoring of the tool and the workpiece but also careful use of the spindle. For example, the monitoring of the state of balance thus prevents damage to bearings, as a result of which the service life of the spindle is approximately doubled. It is therefore essential for the invention that a machine tool system is considered as a whole here.

In certain cases, the controller can also be limited to comparing the balancing data with at least one general balancing parameter. Such a comparison is made, for example, if general measurements, which do not relate to specific subsequent processing are to be made using the machine tool system, such as, for example, the classification of tools as to whether their unbalance is greater or smaller than a specific limiting value.

In contrast to similar methods, it is an express option of the invention to document not only the isolated information about the state of a tool. Instead, a possibility is to be provided of prolonging both the service life of a tool as well as that of, in particular, the spindle by logging and comparing. If an eye is kept on the forces which act on the spindle which is connected during processing to a tool head which is not balanced or is not sufficiently balanced, the reason why the monitoring of the state of unbalance prolongs the useful life of the spindle and reduces the risk of failure becomes clear quickly. Firstly, this permits not only monitoring of the tool and of the workpiece but also careful use of the spindle. Therefore, monitoring of the state of balance prevents, for example, damage to bearings, as a result of which the service life of the spindle is approximately doubled. It is therefore essential for the invention that a machine tool system is considered as a whole here.

Preferred Possible Refinements of the Invention

It is particularly preferred if the controller or the machine tool is equipped in the ready to use state in such a way that one or more parameters for the provided metal-cutting processing can be matched automatically to the balancing data which the balancing log for the respective tool head documents.

This means that the controller tests to what extent the respective tool head is suitable for the metal-cutting processing which is provided (next), in light of the balancing data stored in the balancing log of said tool head. If unsuitability is detected, in this option one or more parameters for the upcoming, metal-cutting processing are matched, e.g. by lowering the operating rotational speed and/or influencing the forward feed—in order to ensure thereby that the upcoming operating conditions match the documented state of balance which has to be accepted at this stage if a stop with subsequent replacement of the tool is to be avoided.

In this way, unnecessary machine downtimes are avoided because operational progress which is relatively slow at certain times is generally to be preferred to a temporary complete shutdown of the machine even if operations could be carried out more quickly after the restart.

The term "ready to use" is understood in this context and in the following context to mean readiness for use of the machine such that there is no need to carry out reprogramming, of which the usual machine operator would not be capable, and no need for intervention in the software or control, which a usual machine operator would not be capable of. Instead, the respective function is continuously activated or it can be activated by a usual machine operator through a menu, by means of a predefined key combination or by plugging in a dongle or the like.

Alternatively or additionally, the controller or the machine tool can also be equipped in a ready-to-use state in such a way that optimization can be performed automatically. Such optimization is considered when the balancing log documents that the currently encountered tool head is not balanced with sufficient accuracy and therefore it is necessary e.g. to automatically set a lower spindle rotational speed than was originally intended. In this way, an operational flow which continues to be stable is achieved and therefore individual optimization of the machine piece production time. These data items can also have cutting parameters or metal-cutting data of the tool added to them in order to optimize a particularly preferred embodiment, or can be displayed separately.

It is particularly favorable if the controller or the machine tool is equipped in the ready-to-use state in such a way that the tool head is exceptionally released for further use, preferably even before said tool head is coupled to the spindle and even if the balancing data of said tool head do not match the parameters of the metal-cutting processing for which this tool head is provided. In this context, the special release is documented, preferably in the balancing log for the respective tool head and/or in the log file of the machine tool.

Such optimization has the great advantage that a shutdown is avoided even if the tool head is actually not suitable for the planned operating conditions but the machine clocking time is permanently predefined by interlinking with other systems so that the reduced performance of the tool head cannot be easily allowed for by slowing down, for example by reducing the spindle rotational speed. In this case, by taking into account the consequences it is possible to make an automatic decision that the tool head is used exceptionally under non-optimum conditions. The optional logging of this fact can ensure, for example, that the tool head is exchanged at the next opportunity even though the metal-cutting tool has not actually reached the state at which a scheduled replacement thereof will take place. In addition, in the event of damage occurring to the machine tool or its spindle only much later under certain circumstances, it can be determined whether the tool heads which are used have always met the required balancing requirements.

Alternatively, pure operation with a balancing traffic light together with documentation is possible, in which the state (green for balanced; red for unbalanced and yellow for unknown) is stored.

It is particularly advantageous if the machine tool which is associated with the system is itself capable of making at least certain determinations with respect to the balancing properties of the tool head—specifically determinations which permit testing as to whether the balancing data which is to be found in the original balancing log can still be correct. Such determinations can be made, for example, by means of a vibration measurement of the machine tool. As soon as values which are increased here are determined, this is a sign that the tool head has to be rejected and subjected at least to renewed logging or balancing.

The balancing log particularly preferably documents one balancing data item, preferably a plurality of balancing data items and ideally all of the balancing data items or at least all of the balancing data items with the exception of two of the balancing data items mentioned below:
   data of the last balancing process,
   data on the permitted rotational speed,
   data on the present static unbalance, with or without the data on the vehicle mass,
   data on the present dynamic unbalance, e.g. as a combination of static unbalance with torque unbalance, with or without a data on the vehicle mass,
   data on the balancing quality according to ISO 21940,
   quotient of the vehicle mass and present residual unbalance,
   balanced/not balanced,
   good/bad state of balance, and
   data on the milling/metal-cutting parameters of the tool which is used.

The system is advantageously equipped in a ready-to-use state in such a way that in the course of the insertion of the respective tool head into a magazine assigned to the machine tool the controller of the machine tool system compares the balance log or the balance data thereof with the one or more parameters of the metal-cutting processing.

Tool heads which are not suitable for the specific purpose of use can as a result be intercepted early.

The system is ideally equipped in a ready-to-use state in such a way that in the course of the ongoing processing from the magazine into the spindel, the controller of the machine tool system compares the balance data of the balance log with the one or more parameters of the metal-cutting processing only before, or preferably also before, the replacement of a tool head.

As a result, the monitoring density and therefore the reliability can be increased even further.

AN ADDITIONAL ASPECT OF THE INVENTION

Furthermore, the invention is based on the object of providing a machine tool for implementing the machine tool system according to the invention as described above.

The Solution According to the Invention in this Regard

In order to solve this further problem, a machine tool is provided which is distinguished by the fact that the machine tool is equipped ready for use for communication with a controller and for reading out a balancing log of the type described above. This generally means that it is equipped "plug-and-play"-ready. For this purpose, the corresponding routines are already implemented by software in its controller, so that the machine tool can be operated according to the invention after corresponding cabling or linking.

Within the scope of one preferred embodiment there is provision that the machine tool comprises the controller as a body-integral component.

Within the scope of one preferred embodiment there is provision that the machine tool comprises the memory for the balancing log as a body-integral component.

The Method Aspect of the Invention

Finally, the invention is based in a subsidiary fashion on the problem of specifying a method which makes it possible to already take into account the unbalancing properties of a tool head at a time which is before the next start of operation of the tool head.

The Solution According to the Invention in this Regard

The solution is composed of a method for reducing unbalance-induced reductions in quality during the metal-cutting processing of workpieces by means of a machine tool system with a machine tool which comprises a spindle which can be riven in rotation for the purpose of machine-cutting processing of workpieces, having a plurality of tools or tool heads which are each clamped in chucks and can be coupled to the spindle, and having a balancing device for balancing the tool heads from chucks and tool, characterized in that a balancing log is stored for each tool head which is read out for a tool head which is to be coupled to the spindle, and is compared with the parameters of the metal-cutting processing for which this tool head is provided.

MISCELLANEOUS

Quite generally it can be stated in conclusion that protection is also claimed for a method which is distinguished by the virtue of the fact that during every balancing process information about the current state of balance of the tool head is stored at the tool head itself and/or in a database, wherein when the tool head is inserted into a machine the state of balance is interrogated and the result of the interrogation is preferably recorded referred to the machine in a log file (e.g. log file of the machine), and finally it is used or rejected depending on the state of balance of the tool head.

Moreover, protection is also claimed for the use of a balancing log which is stored in assignment to a specific tool head, can be read out before the use of the tool head and has the purpose of changing one or more parameters of a metal-cutting processing for which this tool head is provided, so that optimization of the metal cutting process can take place.

Further advantages, methods of operating and configuration possibilities result from the following description of an exemplary embodiment with reference to the figures.

LIST OF THE FIGURES

FIG. 1 gives an overview of an exemplary embodiment of the machine tool system according to the invention.

FIG. 2 shows a preferred pattern according to which the state of balance is retrieved and evaluated.

EXEMPLARY EMBODIMENT

FIG. 1 shows an exemplary embodiment of the invention.

The machine tool system 1 according to the invention is composed of a machine tool 2, preferably in the form of the milling machine indicated here. The workpiece 14 which is to be processed in metal-cutting fashion is clamped thereon.

The machine tool 2 has a main spindle 3. It can also have a plurality of main spindles, which is not illustrated here. A tool head 4 is coupled to the main spindle 3. The tool head 4 is a unit which is generally composed of a chuck 5, the metal-cutting tool 6 which is held in the chuck 5, and possible attachment parts, such as, for example a longitudinal adjustment screw or devices for the directional outputting of a jet of coolant which is supplied to the cutting region.

In the majority of cases, the machine tool 2 is assigned a tool changer 7 which forms a further system component. In the magazine thereof there are different tool heads 4 which, depending on requirements, are coupled to the main spindle 3 of the machine tool and decoupled therefrom.

Finally, the machine tool system 1 according to the invention also includes a balancing device or balancing machine 8. In each case a tool head 4 can be inserted into this balancing machine 8.

The paths which the individual tool heads 4 take in the present exemplary embodiment are illustrated by dot-dashed material flow lines 9. The data flow between the individual components of the machine tool system 1 is illustrated by fine-dotted data flow lines 10.

After the assembly of a chuck 5 and of a metal-cutting tool 6 to form a tool head 4, this tool head 4 is generally fed to the balancing machine 8 in the course of the measurement of the tool or presetting of the tool. The balancing machine 8 also generates, independently of the specific application, a so-called balancing log, on whose ideally provided content more details will be given later. Given known requirements, the state of balance can also be improved here, i.e. the respective tool head 4 is balanced. The balancing log can already be evaluated at this point, for example to determine whether the respective tool head is at all suitable here for equipping machine tool 2 here in light of the planned metal-cutting tasks, or whether it will only be suitable for equipping the machine tool 2 when its state of balance has been improved, for example by repositioning the metal-cutting tool 6 in the chuck 5 or even by removing material at the chuck 5 or adding material, for example in the form of balancing weights.

In this exemplary embodiment, the ultimate balancing log is transmitted to the data memory 11, which can be an integral part of the machine tool 2 here. The balancing log is stored there. The tool head 4 is then fed to the magazine of the tool changer 7. It is also remarkable that the machine tool 2 has a controller 12 which is preferably also integrated into it and which can read out the balancing log from the data memory 11 and process it.

In the course of the metal-cutting processing of workpieces it is generally necessary to change the tool head 4 repeatedly so that the machine tool 2 can carry out the individual processing steps successively in an optimum fashion. As soon as the machine tool 2 requests another tool head 4 from the magazine of the tool changer 7, the controller 12 reads in the associated balancing log from the data memory 11 and automatically compares the balancing data thereof with the parameter or parameters of the metal-cutting processing which is intended subsequently.

If it becomes apparent that the initially selected tool head 4 is not suitable because the balancing log has excessively bad balancing data, the tool head 4 is rejected, i.e. it remains in the magazine of the tool changer 7 and is not even coupled to the spindle 3 of the machine tool.

There is optionally the possibility that the controller 12 or the general control of the machine tool 2 changes the parameters of the metal-cutting processing which is subsequently intended and therefore adapts it in such a way that compliance between the processing parameters and the balancing data of the balancing log is brought about, or corresponding optimization is carried out. The machine then becomes, for example, slower and/or will operate with reduced forward feed or more quickly, that is to say according to modern, software-optimized milling strategies (dry metal cutting), but it can also use the originally selected tool head 4.

Within the scope of one particularly expedient embodiment there is provision that the spindle 3 of the machine tool 2 is itself equipped with an additional unbalance measuring system 13. The machine tool then has the possibility of itself observing over the duration of the ongoing processing whether the tool head retains the balancing quality documented in the balancing log before the start of processing or whether there are at least indications that the balancing quality has changed in the course of the processing, for example as a result of wear or as a result of the breaking off of parts of the cutters and the like. If such indications reveal that the balancing quality has changed, the controller 12 or the general control system of the machine tool 2 preferably then makes an entry in the balancing log and/or in the internal log file of the machine tool. The controller 12 or the general control of the machine tool 2 can particularly preferably make an entry in the data memory. Such an entry in the balancing log will usually lead to a situation in which the respective tool head 4 is removed and reworked. However, it may also be sufficient that the balancing log makes a note of the supposedly lower balancing quality for the future, and then this tool head 4 continues to be used, but then only for less demanding processing steps. In any case, the log file therefore permits for the first time the relationship between the failure of a spindle and the period of use of unbalanced tools to be analyzed.

The vibration metadata relating to the tool are preferably also stored by the controller in the data memory in order to carry out a comparison with other tools.

The state of balance can preferably be described individually or in combination by means of the following balancing data:

Said state of balance can be described by means of the calendar date of the last balancing process. Subsequent to this, it is possible to determine, by means of empirical values which are stored, for example, in the controller 12, when the wear limit at which the tool head 4 can no longer be used but has to be removed is typically reached. The date of the last balancing process can also be evaluated to the effect that a maximum permissible period of time which has passed since this date is defined. If this period of time does not exceed this maximum it can be assumed that the state of balance of the tool also meets the requirements. This is appropriate, in particular, if there is a general agreement that the tool heads are always placed in a specific state of balance during the balancing process. In this case it is not necessary to store detailed data on the state of balance in the balancing log.

The state of balance can also be described by means of data on the permissible rotational speed. This information is the simplest information for clarifying the rotational speed limit of the spindle up to which the respective tool head 4 can be used.

The state of balance can also be specified by data on the residual unbalance which is present, for example the static unbalance and/or the dynamic unbalance, for example as a combination of the static unbalance with the torque unbalance, preferably with additional data on the tool mass. In order to save storage space on a data carrier, the state of balance of the tool can particularly preferably be specified in the form of a coefficient composed of the quotient between the tool mass and the unbalance which is present. The unbalancing quality which is present can be calculated together with the provided operating rotational speed, which is stored in the controller 12 of the machine tool, and said balancing quality can be compared with a setpoint value.

Of course, the state of balance can also be specified by only providing data on the balancing quality. This is possible, in particular, when it is defined in a general agreement that the tool heads are always balanced for use at a specific rotational speed. It is, of course, possible to also specify, at least as additional information relating to the state of balance, whether or not balancing has been carried out at all and if appropriate qualitative information can also be stored as to whether the state of balance is good or bad. In addition, metal-cutting data on the tool can also be stored separately.

Ideally, information is retrieved from the balancing log in one step or in all the steps described in FIG. 2. That is to say the controller 12 ideally firstly retrieves whether information about the state of balance is at all present. It is then interrogated whether the tool has been balanced and when this last took place, that is to say whether the last balancing lies within a permissible time period. What maximum rotational speed is permissible on the basis of the state of balance of the tool head is then interrogated from the log. This maximum rotational speed is compared with the planned operating rotational speed at which the tool head is to be used. It is then interrogated whether the balancing quality is high enough and whether the actual residual unbalance≤the permissible residual unbalance.

If the testing reveals that the state of balance meets the requirements, the tool head is used or displayed with a green status in the control system or the controller.

If the testing reveals that the state of balance does not meet the requirements or is not known, the tool head will be rejected. Alternatively, a special release for use of the tool can take place, i.e. the tool is exceptionally still used in order to avoid interrupting the workflow. This case is expediently logged in a machine-related fashion in a database (for example a log file), or alternatively or additionally displayed with a red status. For the sake of completeness it will also be emphasized that it is advantageous to accommodate the data memory 11 and/or the controller 12 in the machine tool 2, but this does not necessarily have to be the case. Cases are also conceivable in which the data memory 11 and/or the controller 12 are implemented by means of an independent network component which is only connected in terms of data to the balancing machine 8 and the machine tool 2. In this context, in the non-preferred extreme case a data connection is also understood to mean the transmission of data with mobile data carriers.

An exemplary embodiment of a data transfer via a network will be explained below.

In a further exemplary embodiment, the data transfer is implemented via a network. The data memory 11 is located in this further exemplary embodiment remotely from the machine tool 2 in the so-called "data analyzer and controller" (referred to below as DAC). The DAC is, for example, a network-based service program which serves primarily for the management of tool data. In particular, these are not only nominal values but in particular the acquired pre-setting data and balancing data. In this further exemplary embodiment, the balancing machine 8 stores the data in the data memory 11 of the DAC. The data transmission 10 occurs, for example, via an Ethernet network and is stored, in particular, via transport layer security (TLS). The data memory receives the data, for example, via a REST (Representational State Transfer) interface. In particular, the data memory stores the data via the REST interface. In the further exemplary embodiment in the case of planned use of the corresponding tool head the controller 12 interrogates the balancing data, and preferably further tool-specific parameters such as, for example, the data from the pre-setting, likewise via a secured REST interface on the data memory (11) of the DAC. In the exemplary embodiment, for example a controller from the company Heidenheim, type TNC640 is used. After the (balancing) data has been retrieved, the controller (12) determines, in particular, the suitability of the tool head (4) for the planned task. In the case of unsuitability, for example an indication is output to the operator.

It can in turn alternatively also be provided that each tool head 4 itself has a suitable data memory in which the balancing log is stored and, as it were, "also transferred" to the tool head. This can be thought of, for example, as transfer to an integrated RFID chip.

An exemplary embodiment of a data transfer via RFID data carriers will be explained below on the basis of a further exemplary embodiment.

The data flow from the balancing machine 8 to the controller 12 occurs via RFID data carriers in this further exemplary embodiment. In the exemplary implementation, a data carrier, specifically the RFID data carrier or RFID chip, is inserted into the tool holder, in particular in the tool head 4. In the exemplary embodiment, in particular a data carrier from the company Balluff of the type BIS C-122-04/L has been used. This is only exemplary. Other data carriers, for example data carriers of the type BIS C or BIS M from the company Balluff can also be used. It is also possible, for example, to use data carriers or RFID systems from other manufacturers.

In the further exemplary embodiment, the machine tool system 1 comprises a write/read head together with an evaluation unit for transmitting the balancing data to the data carrier. The evaluation unit must, in particular, be compatible with the data carrier. In the solution according to the invention, the evaluation unit with the reading head is used in a low-frequency range. In the further exemplary embodiment, the evaluation unit is connected to [the PC] of the balancing machine 8 via a serial interface (RS232). In the exemplary embodiment, for example an evaluation unit from the company Balluff was used, in particular the model BIS-C-650, which comprises, in particular, a BIS-C reading head which preferably operates in the low-frequency range or in the lower medium wave range, in particular at 70/455 kHz.

In the further exemplary embodiment, the arrangement of the data on the data carrier, for the entire system, is coordinated between the individual components. The controller 12 is preferably the leading system. A configuration file defines the configuration of the data on the data carrier on the balancing machine 8. The configuration file is implemented, in particular, as an XML file. The configuration file expediently satisfies a defined scheme.

If no balancing data are stored for the tool head, a warning is issued with respect to testing, or a yellow display occurs in the control system or on the controller.

LIST OF REFERENCE NUMBERS

1 Machine tool system
2 Machine tool
3 Spindle or main spindle
4 Tool head
5 Chuck
6 Metal-cutting tool
7 Tool changer
8 Balancing machine or balancing device
9 Material flow line
10 Data flow line
11 Data memory
12 Controller
13 Additional unbalance measuring system on the machine tool
14 Workpiece to be cut

The invention claimed is:

1. A machine tool system having a machine tool which comprises a spindle which can be driven in rotation for the purpose of metal-cutting machining workpieces, having a plurality of tools including tool heads, which are clamped in chucks and can be coupled to the spindle, and having a balancing device for balancing the tool heads, wherein the machine tool system comprises a data memory in which an associated balancing log is respectively stored for the system-associated tool heads and a controller which reads out balancing data from the balancing log for a tool head which is coupled to the spindle and compares said data with one or more parameters of the metal-cutting processing for which this tool head is provided or compares said data with at least one general balancing parameter, wherein the machine tool system is preferably configured in such a way that it rejects a tool head if there is no balancing data available for this tool head; and wherein the controller is configured in such a way that it exceptionally permits release for further use of a tool head if the balancing data of said tool head does not match the parameters of the metal-cutting processing for which this tool head is provided, wherein the controller documents the special release in the balancing log for the respective tool head and optionally displays the special release.

2. The machine tool system as claimed in claim 1, wherein the controller is configured in such a way that it adapts one or more parameters for the provided metal-cutting processing to the balancing data, which are documented by the balancing log for the respective tool head.

3. The machine tool system as claimed in claim 1, wherein the controller is configured in such a way that it rejects a tool head, preferably before it is coupled to the spindle, if the balancing data of said tool head do not match one or more parameters of the metal-cutting processing for which this tool head is provided or if the balancing data of said tool head are not sufficiently documented to assess whether they match the one or more parameters of the metal-cutting processing for which this tool head is provided.

4. The machine tool system as claimed in claim 1, wherein the machine tool is equipped in such a way that it can update the balancing log.

5. The machine tool system as claimed in claim 1, wherein the balancing log documents at least one balancing data item, preferably a plurality of balancing data items and ideally at least all of the balancing data items with the exception of two of said items mentioned below: data of the last balancing process, data on the permissible rotation speed, data on the residual unbalance which is present, static unbalance with or without data on the vehicle mass, dynamic unbalance with or without data on the vehicle mass, such as a combination of the static unbalance with torque unbalance, balancing quality with or without data on the vehicle mass, quotient of the vehicle mass/residual unbalance, metal-cutting parameters and milling parameters balanced/not balanced, good or bad state of balance.

6. The machine tool system as claimed in claim 1, wherein in the course of the insertion of the respective tool head into a magazine assigned to the machine tool the controller of the machine tool system compares the balance data of the balance log with the one or more parameters of the metal-cutting processing.

7. The machine tool system as claimed in 1, wherein in the course of the ongoing processing from the magazine, the controller of the machine tool system compares the balance data of the balance log with the one or more parameters of the metal-cutting processing only before, or also before, the replacement of a tool head.

8. The machine tool for use in a machine tool system as claimed in claim 1, wherein the machine tool in the ready to operate state is equipped to read out balance data from the data memory for a balance log via the controller.

9. The machine tool as claimed in claim 8, wherein the machine tool comprises the controller as a body-integral component.

10. The machine tool as claimed in claim 8, wherein the machine tool comprises the data memory for the balance log as a body-integral component.

11. The machine tool system as claimed in claim 1, wherein the machine tool system has a device which displays deviations to one or more parameters.

12. A method for reducing unbalance-induced reductions in quality during metal-cutting processing of workpieces by means of a machine tool system with a machine tool which comprises a spindle which can be driven in rotation for the purpose of metal-cutting processing of workpieces, having a plurality of tools clamped in chucks and can be coupled to the spindle, and having a balancing device for balancing the tools which are clamped in the chucks, wherein a balance log is stored for each tool head, and wherein balancing data of each unbalance log is read out for a tool head which is coupled to the spindle and is compared with the parameters of the metal-cutting processing for which this tool head is provided.

13. A machine tool system having a machine tool which comprises a spindle which can be driven in rotation for the purpose of metal-cutting machining workpieces, having a plurality of tools including tool heads, which are clamped in chucks and can be coupled to the spindle, and having a balancing device for balancing the tool heads, wherein the machine tool system comprises a data memory in which an associated balancing log is respectively stored for the system-associated tool heads and a controller which reads out balancing data from the balancing log for a tool head which is coupled to the spindle and compares said data with one or more parameters of the metal-cutting processing for which this tool head is provided or compares said data with at least one general balancing parameter, wherein the machine tool system is preferably configured in such a way that it rejects a tool head if there is no balancing data available for this tool head; and wherein the balancing log documents at least one balancing data item, preferably a plurality of balancing data items and ideally at least all of the balancing data items with the exception of two of said items mentioned below: data of the last balancing process, data on the permissible rotation speed, data on the residual unbalance which is present, static unbalance with or without data on the vehicle mass, dynamic unbalance with or without data on the vehicle mass, such as a combination of the static unbalance with torque unbalance, balancing quality with or without data on the vehicle mass, quotient of the vehicle mass/residual unbalance, metal-cutting parameters and milling parameters balanced/not balanced, good or bad state of balance.

14. The machine tool system as claimed in claim 13, wherein the controller is configured in such a way that it adapts one or more parameters for the provided metal-cutting processing to the balancing data, which are documented by the balancing log for the respective tool head.

15. The machine tool system as claimed in claim 13, wherein the controller is configured in such a way that it rejects a tool head, preferably before it is coupled to the spindle, if the balancing data of said tool head do not match one or more parameters of the metal-cutting processing for which this tool head is provided or if the balancing data of said tool head are not sufficiently documented to assess whether they match the one or more parameters of the metal-cutting processing for which this tool head is provided.

16. The machine tool system as claimed in claim 13, wherein the controller is configured in such a way that it exceptionally permits release for further use of a tool head if the balancing data of said tool head does not match the parameters of the metal-cutting processing for which this tool head is provided, wherein the controller documents the special release in the balancing log for the respective tool head and optionally displays the special release.

17. The machine tool system as claimed in claim 13, wherein the machine tool is equipped in such a way that it can update the balancing log.

18. The machine tool system as claimed in claim 13, wherein in the course of the insertion of the respective tool head into a magazine assigned to the machine tool the controller of the machine tool system compares the balance data of the balance log with the one or more parameters of the metal-cutting processing.

19. The machine tool system as claimed in 13, wherein in the course of the ongoing processing from the magazine, the controller of the machine tool system compares the balance data of the balance log with the one or more parameters of the metal-cutting processing only before, or also before, the replacement of a tool head.

20. The machine tool for use in a machine tool system as claimed in claim 13, wherein the machine tool in the ready to operate state is equipped to read out balance data from the data memory for a balance log via the controller.

21. The machine tool as claimed in claim 20, wherein the machine tool comprises the controller as a body-integral component.

22. The machine tool as claimed in claim 20, wherein the machine tool comprises the data memory for the balance log as a body-integral component.

23. The machine tool system as claimed in claim 13, wherein the machine tool system has a device which displays deviations to one or more parameters.

* * * * *